US 10,335,891 B2

(12) United States Patent
Sigler et al.

(10) Patent No.: US 10,335,891 B2
(45) Date of Patent: *Jul. 2, 2019

(54) WELD FACE DESIGN FOR SPOT WELDING

(71) Applicant: GM GLOBAL TECHNOLOGY OPERATIONS LLC, Detroit, MI (US)

(72) Inventors: David R. Sigler, Shelby Township, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1509 days.

This patent is subject to a terminal disclaimer.

(21) Appl. No.: 13/841,397

(22) Filed: Mar. 15, 2013

(65) Prior Publication Data

US 2013/0200048 A1 Aug. 8, 2013

Related U.S. Application Data

(63) Continuation-in-part of application No. 11/536,001, filed on Sep. 28, 2006, now Pat. No. 8,436,269.

(51) Int. Cl.
| | |
|---|---|
| *B23K 11/00* | (2006.01) |
| *B23K 11/10* | (2006.01) |
| *B23K 11/30* | (2006.01) |
| *B23K 35/02* | (2006.01) |
| *B32B 15/01* | (2006.01) |
| *C22C 21/00* | (2006.01) |

(52) U.S. Cl.
CPC .......... *B23K 11/10* (2013.01); *B23K 11/3009* (2013.01); *B23K 11/3063* (2013.01); *B23K 35/0205* (2013.01); *B23K 35/0261* (2013.01); *B32B 15/016* (2013.01); *C22C 21/00* (2013.01)

(58) Field of Classification Search
CPC ........ B23K 11/00; B23K 11/30; B23K 11/308
USPC ...................... 219/119, 78.01, 86.1, 84, 91.2
See application file for complete search history.

(56) References Cited

U.S. PATENT DOCUMENTS

| | | | |
|---|---|---|---|
| 1,303,919 A | | 5/1919 | Lachman |
| 2,379,187 A | | 12/1943 | Richards |
| 2,641,670 A | | 8/1950 | Graves, Jr. |
| 3,689,731 A | | 9/1972 | Miller |
| 3,820,437 A | | 6/1974 | Dyer et al. |
| 3,863,337 A | * | 2/1975 | Schreiner ............. H01H 1/0233 200/264 |
| 4,342,893 A | * | 8/1982 | Wolf .................... H01H 11/045 200/268 |

(Continued)

OTHER PUBLICATIONS

U.S. Appl. No. 12/356,613—Notice of Allowance dated Feb. 22, 2012 (9 pages).

(Continued)

*Primary Examiner* — Dana Ross
*Assistant Examiner* — Ayub A Maye
(74) *Attorney, Agent, or Firm* — Reising Ethington P.C.

(57) ABSTRACT

A welding electrode for use in engaging an aluminum alloy workpiece during a spot welding process has a weld face that includes a base surface and a plurality of circular ridges that project outwardly from the base surface. The circular ridges are blunted, and their presence on the weld face provides the first welding electrode with several useful capabilities, including the ability to establish better mechanical and electrical contact with the aluminum alloy workpiece.

12 Claims, 3 Drawing Sheets

(56) References Cited

U.S. PATENT DOCUMENTS

| | | | | |
|---|---|---|---|---|
| 4,400,608 | A | * | 8/1983 | Wagatsuma ....... B23K 35/0205 219/107 |
| 4,495,397 | A | * | 1/1985 | Opprecht ................ B23K 11/14 219/86.1 |
| 4,588,870 | A | | 5/1986 | Nadkarni et al. |
| 4,591,687 | A | * | 5/1986 | Urech ................ B23K 11/3009 219/118 |
| 4,610,153 | A | | 9/1986 | Nedorezov |
| 5,015,816 | A | | 5/1991 | Bush et al. |
| 5,304,769 | A | | 4/1994 | Ikegami et al. |
| 5,844,194 | A | * | 12/1998 | Kuwabara ................ B22F 7/08 219/118 |
| 5,951,888 | A | | 9/1999 | Oakley |
| 6,037,559 | A | * | 3/2000 | Okabe .................. B23K 11/115 219/118 |
| 6,322,296 | B1 | | 11/2001 | Wetli et al. |
| 6,861,609 | B2 | | 3/2005 | Sigler |
| 7,249,482 | B2 | | 7/2007 | Chen |
| 8,222,560 | B2 | | 7/2012 | Sigler et al. |
| 8,274,010 | B2 | | 9/2012 | Sigler et al. |
| 8,350,179 | B2 | | 1/2013 | Schroth et al. |
| 8,436,269 | B2 | | 5/2013 | Sigler et al. |
| 8,481,170 | B2 | | 7/2013 | Sigler et al. |
| 8,525,066 | B2 | | 9/2013 | Sigler et al. |
| 2003/0116539 | A1 | | 6/2003 | Wile et al. |
| 2005/0211677 | A1 | * | 9/2005 | Chen .................... B23K 11/115 219/117.1 |
| 2006/0081563 | A1 | | 4/2006 | Ueda et al. |
| 2009/0255908 | A1 | | 10/2009 | Sigler et al. |
| 2010/0258536 | A1 | | 10/2010 | Sigler et al. |
| 2011/0253681 | A1 | | 10/2011 | Wang et al. |
| 2013/0008295 | A1 | | 1/2013 | Sigler et al. |
| 2013/0015164 | A1 | | 1/2013 | Sigler et al. |
| 2013/0048613 | A1 | | 2/2013 | Sigler et al. |
| 2013/0168367 | A1 | | 7/2013 | Sigler et al. |

OTHER PUBLICATIONS

U.S. Appl. No. 12/356,613—Non-final Office Action dated Aug. 17, 2011 (11 pages).

U.S. Appl. No. 12/821,435—Final Office Action dated Jun. 19, 2013 (13 pages).

U.S. Appl. No. 12/251,635—Final Office Action dated Jun. 6, 2013 (14 pages).

U.S. Appl. No. 12/251,635—Non-final Office Action dated Sep. 16, 2011 (10 pages).

U.S. Appl. No. 11/536,001—Notice of Allowance dated Jan. 10, 2013 (8 pages).

U.S. Appl. No. 11/536,001—Non-final Office Action dated May 21, 2012 (9 pages).

U.S. Appl. No. 11/536,001—Non-final Office Action dated Apr. 26, 2011 (8 pages).

U.S. Appl. No. 11/536,001—Non-final Office Action dated Aug. 6, 2009 (10 pages).

U.S. Appl. No. 13/777,345—Non-final Office Action dated Jun. 19, 2013 (13 pages).

Chinese Mechanical Engineering Society Welding Branch; Resistance Welding (II) Professional Committee; Theory and Practice of Resistance Welding, First Edition, published in Beijing; Chine Machine Press; Jan. 1994; ISBN: 7-111-03469-4/TG.759; pp. 274-277.

* cited by examiner

WELD FACE DESIGN FOR SPOT WELDING

This application is a continuation-in-part of Ser. No. 11/536,001, filed on Sep. 28, 2006, now U.S. Patent Application Publication No. 2008/0078749. The complete contents of that application are herein incorporated by reference.

TECHNICAL FIELD

This disclosure relates generally to a welding electrode suitable for forming resistance spot welds, for example, in a metal workpiece stack-up that includes at least one aluminum alloy workpiece.

BACKGROUND

Several different types of vehicle body components—such as doors, hoods, decklids, and liftgates, to name but a few—include two or more metal workpieces that are joined together. The metal workpieces may be joined at least in part by one or more resistance spot welds. These welds are usually formed around a periphery of the body component or at some other bonding region. In the past, the metal workpieces have typically been composed of steel, and for that reason spot welding practices have been specifically developed over many years with the particular aspects of spot welding steel to steel in mind. More recently, however, there has been a push to substitute aluminum alloy workpieces for steel workpieces wherever possible to try and reduce vehicle weight.

A resistance spot weld is generally formed by a stationary or robotically-moveable welding gun that includes two gun arms. Each of these gun arms holds a welding electrode typically comprised of a suitable copper alloy. The gun arms can be positioned on opposite sides of a workpiece stack-up and clamped to press the two electrodes against their respective metal workpieces at diametrically common locations. A momentary electrical current is then passed through the metal workpieces from one electrode to the other. Resistance to the flow of electrical current through the metal workpieces and across their faying interface (i.e., the contacting interface of the metal workpieces) generates heat at the faying interface. This heat forms a molten weld pool which, upon stoppage of the current flow, solidifies into a weld nugget. After the spot weld is formed, the gun arms release their clamping force, and the spot welding process is repeated at another weld site.

The spot welding of a workpiece stack-up that includes an aluminum alloy workpiece can present peculiar challenges. For one, the aluminum alloy workpiece is usually covered by a variety of oxide layers (hereafter collectively referred to in the singular form as "oxide layer" for brevity) on its outer surface created both by processes experienced in mill operations (e.g., annealing, solution treatment, casting, etc.) as well as environmental exposure. This oxide layer increases electrical resistance at the contact patch. Because of the high electrical resistance of the oxide layer and the relatively low thermal and electrical resistance of the underlying bulk aluminum alloy, a high current density is typically required to form a weld pool at the surface of the aluminum alloy workpiece that forms a faying interface with the other metal workpiece in the stack-up.

While helpful in forming a weld pool at the desired location, a high current density can create excessive heat at the contact patch which, in turn, may accelerate a metallurgical reaction between the aluminum alloy that comprises the workpiece and the copper alloy that comprises the associated welding electrode. This reaction causes a contamination layer of copper-aluminum alloy to build-up or accumulate on the welding electrode. If left undisturbed, the contamination build-up can spall and form pits in the welding electrode, which ultimately harms welding performance and complicates electrode dressing. These complications, as well as others, present a variety of challenges regarding the design of a welding electrode that is intended to engage an aluminum alloy workpiece during spot welding, as opposed to some other type of metal workpiece, such as a steel workpiece.

SUMMARY

Commonly assigned US Pat. Application Pub. No. 2008/0078749 discloses the presence of ringed ridges on the weld face of a spot welding electrode. The present disclosure further describes welding electrode embodiments that include ringed rides. Here, a welding electrode has a weld face specifically designed to experience spot welding engagement with an accessible outer surface of an aluminum alloy workpiece. The weld face is dome-shaped and, additionally, includes a plurality of circular ridges that project outwardly from a base surface of the weld face. These ridges are blunted to induce lateral stretching and fracture of the oxide layer present on the aluminum alloy workpiece surface when brought into contacting engagement with that surface during spot welding. Anywhere from two to ten outwardly projecting circular ridges may be present on the weld face and, preferably, this number is between three and five. The base surface of the weld face, moreover, preferably includes at least one planar surface that may be located within the innermost circular ridge or between any pair of adjacent circular ridges.

DETAILED DESCRIPTION

Figure 1:
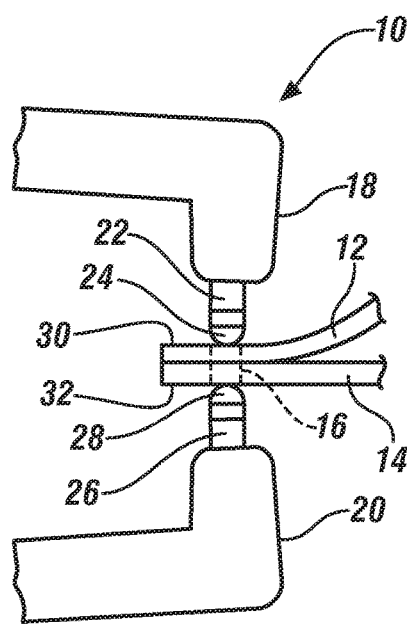
FIG. 1 is a generalized side view of a welding gun adapted to form resistance spot welds in a workpiece stack-up.

FIG. 1 shows a welding gun 10 that can be used to resistance spot weld a first aluminum alloy workpiece 12 and a second aluminum alloy workpiece 14 at a weld site 16. The first and second aluminum alloy workpieces 12, 14 are composed of an aluminum alloy such as an aluminum-magnesium alloy, an aluminum-silicon alloy, or an aluminum-magnesium-silicon alloy, and can be anywhere from about 0.5 mm to about 6.0 mm thick. A specific example of an aluminum alloy workpiece is a 1.0 mm thick 5754-O aluminum alloy. Other aluminum alloys and specific workpiece thicknesses are possible though. For that reason, the term "workpieces," as used herein, is meant to broadly encompass sheet metal layers, extrusions, castings, and other aluminum alloy pieces that are resistance spot weldable.

The welding gun 10 is usually one part of a larger automated welding operation, and includes a first gun arm 18 and a second gun arm 20 that are mechanically and electrically configured to repeatedly form spot welds, as is well understood in the art. The first gun arm 18 has a first electrode holder 22 that retains a first copper alloy welding electrode 24, and likewise the second gun arm 20 has a second electrode holder 26 that retains a second copper alloy welding electrode 28. The welding gun arms 18, 20 are operated during spot welding to clamp their respective welding electrodes 24, 28 against oppositely-facing first and second accessible outer surfaces 30, 32 of the overlapping aluminum alloy workpieces 12, 14. The first and second welding electrodes 24, 28 are clamped against their respective workpiece surfaces 30, 32 in diametric alignment with one another so that the current exchanged between them can concentrate heat and form a spot weld at the intended weld site 16. While the first welding electrode 24 is depicted in the remaining Figures and is subsequently referred to in this description for illustrative purposes, it should be appreciated that the Figures and description can also apply equally to the second welding electrode 28, if desired.

Figure 2:
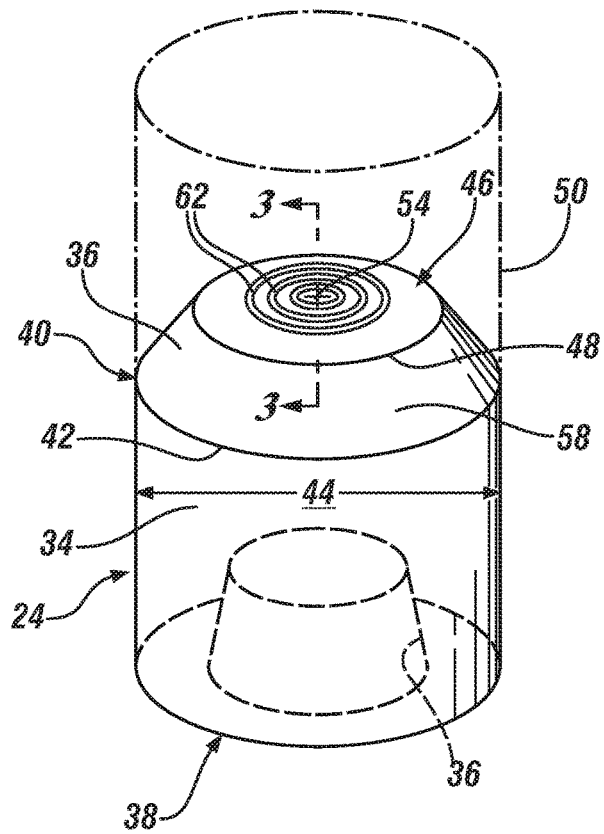
FIG. 2 is a generalized perspective view of a welding electrode.
Figure 3:
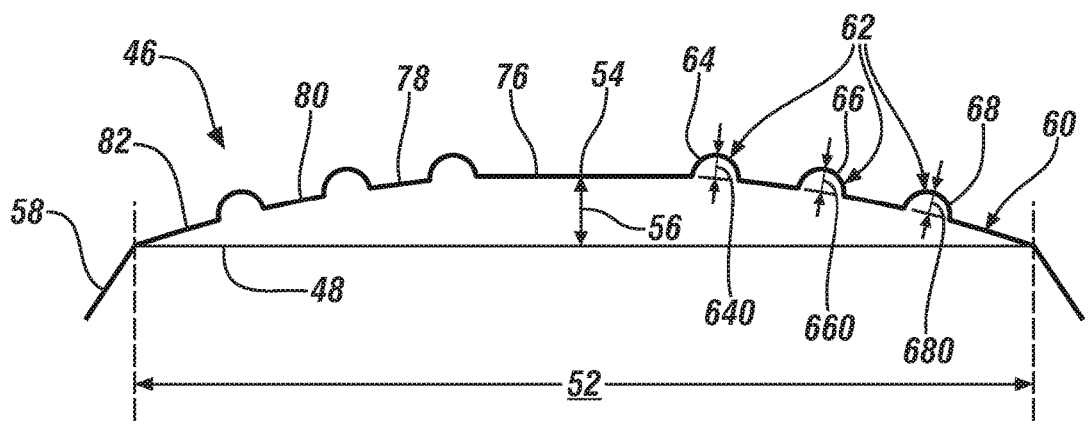
FIG. 3 is a cross-sectional view of the weld face of a welding electrode according to one embodiment.

Referring now to FIGS. 2-3, the first welding electrode 24 has a generally cylindrical body 34 that defines a hollowed recess 36 accessible at one end 38 for insertion of, and attachment with, the first electrode holder 22. The other end 40 of the body 34 has a circumference 42 whose diameter 44 may range from about 10 mm to about 22 mm. The first welding electrode also includes a domed-shaped weld face 46 that physically contacts the accessible outer surface 30 of the first aluminum alloy workpiece 12 during spot welding. The weld face 46 preferably has a circumference 48 that is upwardly displaced from, and situated within an imaginary axial cylindrical extension 50 of, the circumference 42 of the body 34, with the two circumferences 42, 48 being parallel as shown or offset such that the circumference 48 of the weld face 46 is tilted relative to the circumference 42 of the body 34. A diameter 52 of the circumference 48 of the weld face 46 typically ranges from about 5.5 mm to about 18 mm or, more preferably, from about 7 mm to about 12 mm.

The weld face 46 also includes a center 54 that is raised above the circumference 48 of the weld face 46 to a height 56 of about 0.5% to about 15% of the diameter 52 of the weld face circumference 48. Preferably, though, this height 56 ranges from about 2% to about 8% of the diameter 52 of the weld face circumference 48, as illustrated by the following examples: (1) a weld face diameter 52 of about 7 mm and a weld face height 56 of about 0.15 mm [height 56 is about 2.2% of diameter 52]; and (2) weld face diameter 52 of 12 mm and weld face height of about 0.92 mm [height 56 is about 7.7% of diameter 52]. In addition to the body 34 and the weld face 46, the first welding electrode 24 may also include a transition region 58 that transitions from the circumference 42 of the body 34 to the circumference 48 of the weld 46. This transition region 58 may be frusto-conical in shape, as shown, or it may have some other suitable shape. In some applications, however, the circumference 42 of the body 34 and the circumference 48 of the weld face 46 are coincident. Such electrodes are usually termed "full-face electrodes."

The weld face 46 includes a base surface 60 and a plurality of circular ridges 62 that project outwardly from the base surface 60. The base surface 60 is the nominal surface of the weld face 46, and accounts for 50% or more, preferably between about 50% and 80%, of the surface area of the weld face 46, with the remaining surface area being attributed to the circular ridges 62. The base surface 60 may be configured to have a desired shape or combination of shapes that provides the weld face 46 with its overall dome shape. Portions of the base surface 60 located radially outward of the plurality of circular ridges 62, or between the circular ridges 62, may be curved or planar depending on several factors including the complexity of any required weld face re-dressing procedures that may have to be periodically practiced.

As shown, for example, the weld face 46 may include a first circular ridge 64 that surrounds its center 54, preferably equidistantly in all directions. The weld face 46 may further include a second circular ridge 66 radially outwardly spaced from the first circular ridge 64 and a third circular ridge 68 radially outwardly spaced from the second circular ridge 66. The first, second, and third circular ridges 64, 66, 68 each have a closed circumference; that is, the circumferences of the circular ridges 64, 66, 68 are generally constant in cross-sectional shape and are uninterrupted by significant separations or other discontinuities. Additional circular ridges 62 (although not shown here) of similar construction may also be radially outwardly spaced from the third circular ridge 68. The following discussion of the first, second, and third circular ridges 64, 66, 68 therefore also applies to any additional circular ridges 62 that may be present. Anywhere from one to seven additional circular ridges 62 may be included on the weld face 46 if desired.

Figure 3A:
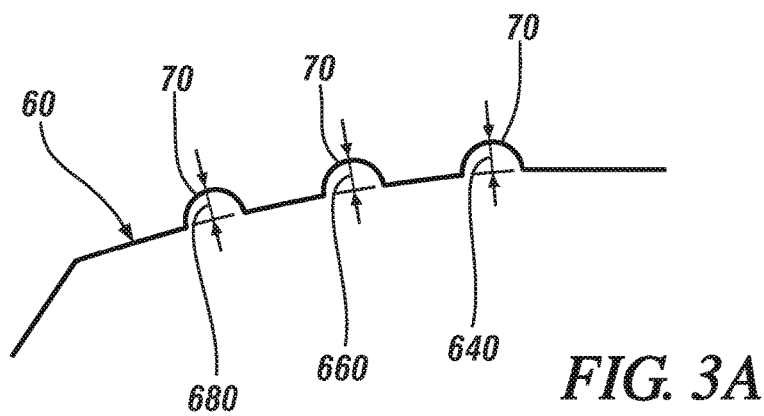
FIG. 3A is an enlarged partial cross-sectional view of the weld face of a welding electrode according to one embodiment.
Figure 3B:
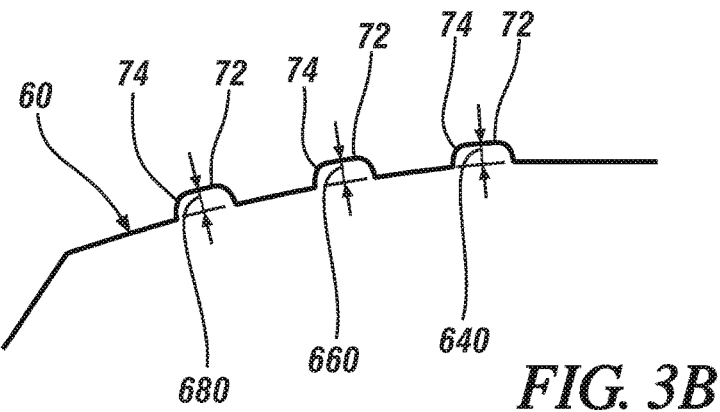
FIG. 3B is an enlarged partial cross-sectional view of the weld face of a welding electrode according to another embodiment.

The first, second, and third circular ridges 64, 66, 68 (and any others if present) are each blunted. This means the circular ridges 64, 66, 68 do not include any sharp edges. Such blunted circular ridges are employed here to laterally stretch and fracture the surface oxide layer present on the accessible outer surface 30 of the first aluminum alloy workpiece 12—as opposed to piercing it—when the weld face 46 is brought into contact with the workpiece surface 30 during spot welding. To be blunted, for instance, one or more of the circular ridges 64, 66, 68 may have a cross-section that includes a rounded top surface 70, as shown in FIG. 3A. In another embodiment, one or more of the circular ridges 64, 66, 68 may have a cross-section that includes a flat top surface 72 bordered by a radiused peripheral edge 74, as shown in FIG. 3B. Other cross-sections that provide the first, second, and third circular ridges 64, 66, 68 with a blunted profile are of course permitted despite not being explicitly shown in the Figures.

The size and spacing of the first, second, and third circular ridges 64, 66, 68 can be varied to meet certain process considerations. These process considerations include but are not limited to the depth penetration of the circular ridges 64, 66, 68 into the first aluminum alloy workpiece 12, the establishment of good mechanical and electrical contact between the weld face 46 and the first aluminum alloy workpiece 12, the quality of the weld nugget formed, and the ease with which the weld face 46 can be re-dressed. As shown in FIGS. 3-3B, each of the first, second, and third circular ridges 64, 66, 68 has a ridge height 640, 660, 680—taken at the mid-point of the ridge 64, 66, 68 when viewed in cross-section—that extends above the base surface 60. The ridge height 640, 660, 680 of each circular ridge 64, 66, 68 preferably ranges from about 20 µm to about 200 µm. The spacing of the ridges 64, 66, 68 between their ridge heights 640, 660, 680 (a peak-to-peak spacing measurement), moreover, preferably ranges from about 80 µm to about 1500 µm.

Referring now to FIGS. 3-6, the base surface 60 of the weld face 46 preferably includes one or more planar surfaces. A "planar surface" as used in the present disclosure is a generally flat surface whose convex radius of curvature is no less than 200 mm when viewed in cross-section. In FIG. 3, for example, the base surface 60 includes a central planar base surface portion 76 located inside the first circular ridge 64. The central planar base surface portion 76 is spaced at least 40% below the ridge height 640 of the first circular ridge 64 and is preferably centered on the center 54 of the weld face 46. The weld face embodiment in FIG. 3 further includes a first intervening base surface portion 78 located between the first and second circular ridges 64, 66, a second intervening base surface portion 80 located between the second and third circular ridges 66, 68, and a peripheral base surface portion 82 located radially outwardly of the third circular ridge 68. The first intervening, second intervening, and peripheral base surface portions 78, 80, 82 are all convexly curved, as shown, to provide the base surface 60 with a radius of curvature from the circumference 48 of the weld face 46 to the first circular ridge 64 that ranges from about 20 mm to about 40 mm.

Figure 4:
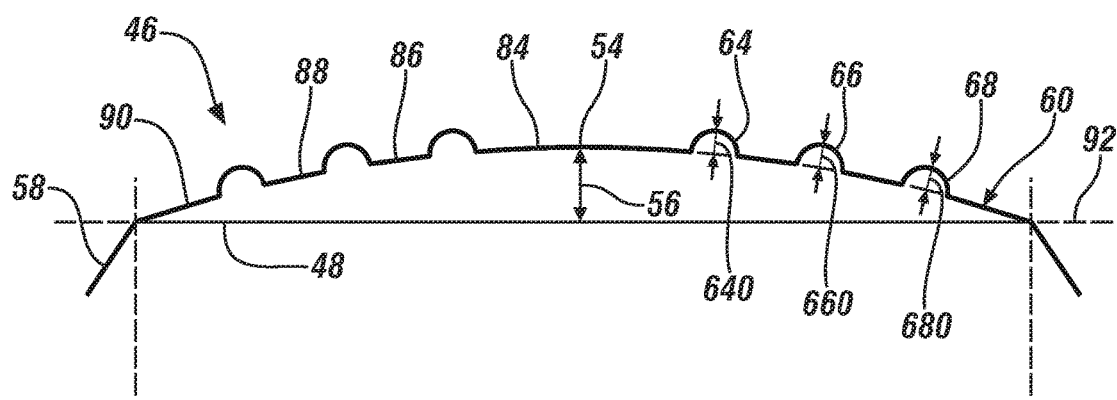
FIG. 4 is a cross-sectional view of the weld face of a welding electrode according to another embodiment.

In another embodiment, as shown in FIG. 4, the base surface 60 includes a central spherical base surface portion 84 located inside the first circular ridge 64. The central spherical base surface portion 84 is spaced at least 40% below the ridge height 640 of the first circular ridge 64 and has a radius of curvature that ranges from about 20 mm to about 40 mm. It is also preferably centered on the center 54 of the weld face 46. The weld face embodiment in FIG. 4 further includes a first intervening base surface portion 86 located between the first and second circular ridges 64, 66, a second intervening base surface portion 88 located between the second and third circular ridges 66, 68, and a peripheral base surface portion 90 located radially outwardly of the third circular ridge 68. The first intervening, second intervening, and peripheral base surface portions 86, 88, 90 are all planar. And one or more of those surface portions 86, 88, 90 may be inclined at an angle of up to about 45° relative to a plane 92 that intersects the circumference 48 of the weld face 46, as they are all shown in FIG. 4, or one or more of those surface portions 86, 88, 90 may be parallel to the circumference 48 of the weld face 46.

Figure 5:
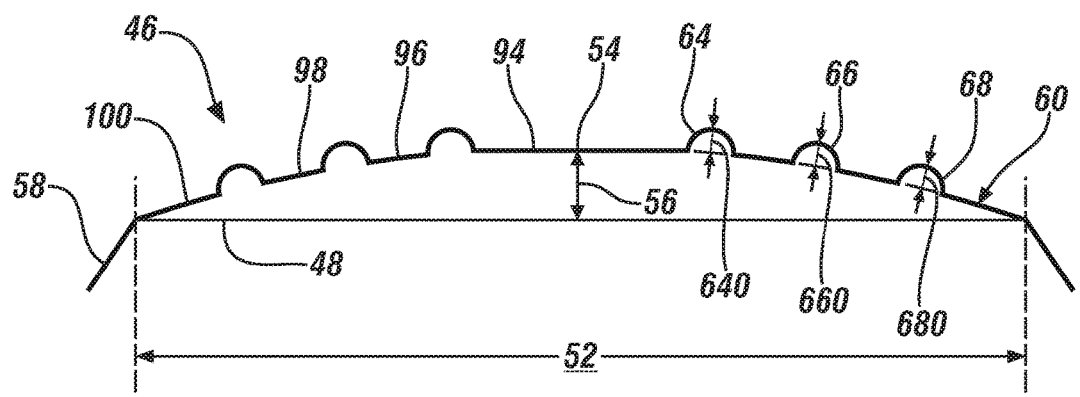
FIG. 5 is a cross-sectional view of the weld face of a welding electrode according to yet another embodiment.

In yet another embodiment, as shown in FIG. 5, the base surface 60 includes a central planar base surface portion 94 located inside the first circular ridge 64. The central planar base surface portion 94, similar to before, is spaced at least 40% below the ridge height 640 of the first circular ridge 64 and is preferably centered on the center 54 of the weld face 46. The weld face embodiment in FIG. 5 further includes a first intervening base surface portion 96 located between the first and second circular ridges 64, 66, a second intervening base surface portion 98 located between the second and third circular ridges 66, 68, and a peripheral base surface portion 100 located radially outwardly of the third circular ridge 68. Here, the first intervening base surface portion 96 and the peripheral base surface portion 100 are each convexly curved with a radius of curvature that ranges from about 20 mm to about 40 mm, while the second intervening base surface portion 98 is planar and inclined at an angle of up to about 45° relative to the plane 92 that intersects the circumference 48 of the weld face 46.

Figure 6:
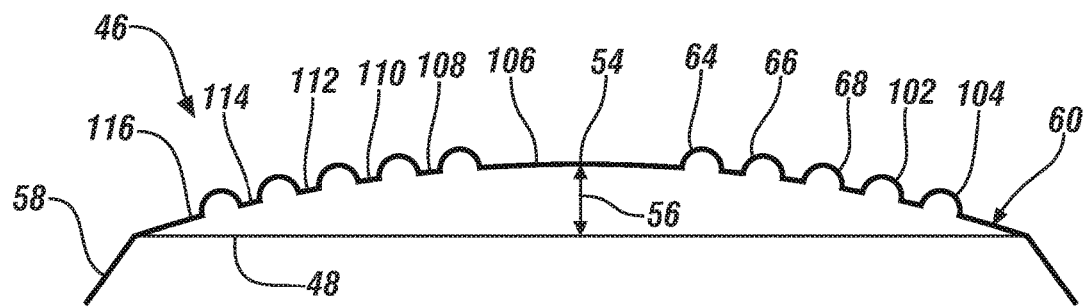
FIG. 6 is a cross-sectional view of the weld face of a welding electrode according to still another embodiment.

In still another embodiment, as shown in FIG. 6, the weld face 46 includes two additional circular ridges 62 that project outwardly from the base surface 60: a fourth circular ridge 102 radially outwardly spaced from the third circular ridge 68 and a fifth circular ridge 104 radially outwardly spaced from the fourth circular ridge 102. The base surface 60 shown here includes a planar central base surface portion 106—similar to the those previously described in FIGS. 3 and 5—located inside the first circular ridge 64. The weld face embodiment in FIG. 6 further includes a first intervening base surface portion 108 located between the first and second circular ridges 64, 66, a second intervening base surface portion 110 located between the second and third circular ridges 66, 68, a third intervening base surface portion 112 located between the third and fourth circular ridges 68, 102, a fourth intervening base surface portion 114 located between the fourth and fifth circular ridges 102, 104, and a peripheral base surface portion 116 located radially outwardly of the fifth circular ridge 104. Each of these base surface portions 108, 110, 112, 114, 116 may be either convexly curved with a with a radius of curvature that ranges from about 20 mm to about 40 mm, as they are shown in FIG. 6, or planar and inclined as described earlier.

Figure 7:
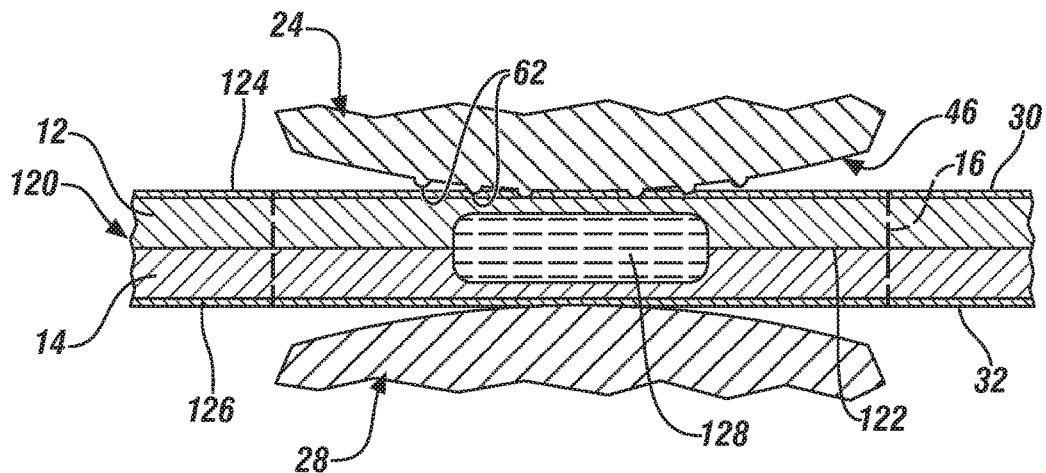
FIG. 7 is a an enlarged cross-sectional view of a pair of welding electrodes engaged in resistance spot welding of a pair of overlapping aluminum alloy workpieces.

The first welding electrode 24, as described above, may be used in combination with the second welding electrode 28 to resistance spot weld a workpiece stack-up 120 that includes the first aluminum alloy workpiece 12 overlapping the second aluminum alloy workpiece 14 to form a faying interface 122, as depicted generally in FIG. 7. As noted earlier, each of the first aluminum alloy workpiece 12 and the second aluminum alloy workpiece 14 typically includes an oxide layer 124, 126 (not drawn to scale in FIG. 7) at its accessible outer surface 30, 32 that overlies the more electrically conductive bulk aluminum alloy material. These surface oxide layers 124, 126 are usually about 0.03 µm to about 0.07 µm thick. The weld face 46 of the first welding electrode 24 is designed to fracture and breach such an oxide layer so that current can be more efficiently exchanged with the weld face of the second welding electrode 28 through the aluminum alloy workpieces 12, 14. While the following discussion focus on the functionality of the weld face 46 of the first welding electrode 24 during the spot welding process, it should be understood that the second welding electrode 28 may have the same weld face configuration as that of the first welding electrode 24, and thus achieve the same functionality, even though not specifically depicted in FIG. 7.

To begin, the workpiece stack-up 120 is located between the first and second welding electrodes 24, 28 so that the electrodes 24, 28 are generally diametrically aligned with one another at the intended weld site 16. The workpiece stack-up 120 may be brought to such a location, as is often the case when the gun arms 18, 20 are part of a stationary pedestal welder, or the gun arms 18, 20 may be robotically moved to locate the electrodes 24, 28 relative to the weld site 16. Once the workpiece stack-up 120 is properly located, the first and second gun arms 18, 20 converge to clamp the weld faces of the first and second welding electrodes 24, 28 against the oppositely-facing accessible outer surfaces 30, 32 of the first and second aluminum alloy workpieces 12, 14. Each weld face forms a contact patch with its respective workpiece 12, 14 at the weld site 16. And the clamping force imparted to the first welding electrode 24 brings one or more of the circular ridges 62 present on its weld face 46 into pressurized contact with the oxide layer 124. This type of blunt engagement causes the oxide layer 124 to laterally stretch and to begin to fracture around the weld face 46, which permits better metal-to-metal contact between the first welding electrode 24 and the first aluminum alloy workpiece 12.

A welding current is then passed between the weld faces of the first and second welding electrodes 24, 28 and through the aluminum alloy workpieces 12, 14. Resistance to the concentrated flow of the welding current through the metal workpieces 12, 14 and across their faying interface 122 generates heat at the faying interface 122 within the weld site 16. This heat initiates a single molten weld pool at the faying interface 122 that grows and penetrates into each aluminum alloy workpiece 12, 14. Upon stoppage of the welding current, the molten weld pool solidifies into the weld nugget 128. The first and second welding electrodes 24, 28 are then retracted from their engaged accessible outer surfaces 30, 32 of the aluminum alloy workpieces 12, 14. Next, the workpiece stack-up 120 is re-located between the first and second welding electrodes 24, 28 at a different weld site 16, or it is moved away so that another workpiece stack-up 120 can be located for spot welding. More spot welds are then formed in the same way.

During the spot welding process, the weld face 46 of the first welding electrode 24 contacts and impresses into the accessible outer surface 30 of the first aluminum alloy workpiece 12. It also exchanges electrical current with the weld face of the second welding electrode 28 to form the weld nugget 128. The circular ridges 62 on the weld face 46 provide the first welding electrode 24 with several useful capabilities. These capabilities include greater mechanical stability of the welding electrode 24 during the spot welding process, reduced electrical resistance at the interface between the weld face 46 and the accessible outer surface 30 of the aluminum alloy workpiece 12, improved heat flow between the welding electrode 24 and the aluminum alloy workpiece 12, the virtual elimination of surface molten metal expulsion, the ability to use a sharper weld face than has conventionally been used for spot welding aluminum alloy workpieces (which in turn provides improved process robustness), and ease of creating and maintaining the outwardly projecting circular ridges 62.

With regards to mechanical stability, the tops of the circular ridges 62 contact and impress into the accessible outer surface 30 of the aluminum alloy workpiece 12 during spot welding before contact is established with the base surface 60. This leading ridge contact results in enhanced contact pressure at the ridges 62 that deforms and stretches the oxide layer 124 and the underlying bulk aluminum alloy. Imbedding the circular ridges 62 into the accessible outer surface 30 in this way mechanically stabilizes or "keys" the welding electrode 24 in place, which can be quite useful. For instance, during spot welding of the aluminum alloy workpiece 12 at 30,000 to 40,000 amps or more, the lateral skidding force on the gun arm 18 can exceed a hundred pounds. In the absence of the circular ridges 62 on the weld face 46, this lateral skidding force is more likely to cause the welding electrode 24 to move or skid sideways and, thus, disrupt the process of forming the weld nugget 128.

In addition to mechanically stabilizing the welding electrode 24, pressing the circular ridges 62 into the accessible outer surface 30 stretches the outer surface 30 over the projecting circular ridges 62 and creates suspension points whereby workpiece material trapped between the ridges 62 is stretched prior to contacting the base surface 60. When resistance spot welding the aluminum alloy workpiece 12, for example, this action of stretching the accessible outer surface 30 at the ridges 62, and between the ridges 62, breaks up the brittle oxide layer 124 present at the outer surface 30 to provide good electrical and thermal contact between the weld face 46, as a whole, and the bulk aluminum alloy of the workpiece 12. The improvement in electrical and thermal contact between the weld face 46 and the aluminum alloy workpiece 12 reduces the amount of heat produced at the interface of those two structures, which allows the sharper weld face 46 to pass a higher current density without unnecessarily accelerating the build-up of copper-aluminum alloy contamination material on the weld face 46. This results in a welding process that is much more robust to manufacturing variables such as welding with gaps present between overlying workpieces or welding with electrodes tilted with respect to the workpiece surface to be welded.

The circular ridges 62 can also significantly suppress external molten metal expulsion. During resistance spot welding, for instance, the domed weld face 46 will indent into the accessible outer surface 30 of the aluminum alloy workpiece 12 to continuously create a larger contact patch. A greater fraction of the weld face 46 will be brought into contact with the accessible outer surface 30 as the patch grows. Since the circular ridges 62 project above the base surface 60 of the weld face 46, the outermost portion of the weld face 46 that contacts the accessible outer surface 30 farthest from the weld center will usually be a ridge 62 (see FIG. 7). This outer contacting ridge 62 acts as a barrier or containment for any molten metal that may spurt away from the accessible outer surface 30 during welding. The virtual elimination of external molten metal expulsion improves perceived quality of the weld and makes for a better show surface.

Lastly, the dressing (original formation of the circular ridges 62) and re-dressing (re-forming of the circular ridges 62 and removal of contamination) of the circular ridges 62 is fairly easy. Since the circular ridges 62 have a closed circumference, a rotating cutting blade can be used to cut and reform the ridges 62 on the weld face 46. Manufacture of such a blade is fairly straightforward. For example, a blade can be initially ground to have a cutting profile that is converse to the domed weld face 46. Small grooves can then be machined into the blade at locations that correspond to the position of the circular ridges 62 on the weld face 46 so that registry between the blade and the weld face 46 can be initially achieved. In operation, the cutting blade can be brought into contact with the weld face 46, including its outwardly projecting circular ridges 62 and the base surface 60 (e.g., the base surface portions 76, 78, 80, and 82 in FIG. 3), and rotated relative to the welding electrode 24 without having to remove the electrode 24 from the gun arm 18. The use of a simple cutting blade with machined grooves positioned to cut and redress the circular ridges 62 has been found to last thousands of dresses without compromising the overall geometry of the weld face 46.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:
1. A welding electrode comprising:
   a cylindrical body of the welding electrode, which welding electrode forms resistance spot welds in a metal workpiece stack-up, the cylindrical body defining a hollow recess at a first end and having a circumference at a second end; a weld face supported on the second end of the cylindrical body, the weld face having a circumference and a center, the center of the weld face being raised above the circumference of the weld face to a height of about 0.5% to about 15% of a diameter of the circumference of the weld face; and wherein the weld face includes a plurality of circular ridges that project outwardly from a base surface, the plurality of circular ridges comprising a first circular ridge that surrounds the center of the weld face, a second circular ridge radially outwardly spaced from the first circular ridge, and a third circular ridge radially outwardly spaced from the second circular ridge, wherein each of the first, second, and third circular ridges is blunted and has a closed circumference, and wherein the base surface of the weld face comprises a central base surface portion located inside the first circular ridge, and wherein the central base surface portion is spaced below a ridge height of the first circular ridge.

2. The welding electrode of claim 1, wherein one or more of the first, second, and third circular ridges has a flat top surface.

3. The welding electrode of claim 1, wherein each of the first, second, and third circular ridges has a ridge height that ranges from about 20 μm to about 200 μm.

4. The welding electrode of claim 1, wherein the ridge height of the first circular ridge and the ridge height of the second circular ridge are spaced apart by about 80 μm to about 1500 μm, and the ridge height of the second circular ridge and the ridge height of the third circular ridge are spaced apart by about 80 μm to about 1500 μm.

5. The welding electrode of claim 1, wherein the weld face further includes from one to seven additional circular ridges that project outwardly from the base surface of the weld face.

6. The welding electrode of claim 1, wherein the height that the center of the weld face is raised above the circumference of the weld face ranges from about 2% to about 8% of the diameter of the circumference of the weld face.

7. The welding electrode set forth in claim 1, wherein the circumference of the weld face is upwardly displaced from the circumference of the cylindrical body by a transition region.

8. A welding electrode comprising:
a cylindrical body of the welding electrode, which welding electrode forms resistance spot welds in a metal workpiece stack-up, the cylindrical body defining a hollow recess at a first end and having a circumference at a second end; and a weld face supported on the second end of the cylindrical body, the weld face having a circumference and a center, the center of the weld face being raised above the circumference of the weld face to a height of about 0.5% to about 15% of a diameter of the circumference of the weld face; wherein the weld face includes a plurality of circular ridges that project outwardly from a base surface, the plurality of circular ridges comprising a first circular ridge that surrounds the center of the weld face, a second circular ridge radially outwardly spaced from the first circular ridge, and a third circular ridge radially outwardly spaced from the second circular ridge, each of the first, second, and third circular ridges being blunted and having a closed circumference, and wherein the base surface of the weld face comprises a central base surface portion located inside the first circular ridge, a first intervening base surface portion located between the first circular ridge and the second circular ridge, a second intervening base surface portion located between the second circular ridge and the third circular ridge, a peripheral base surface portion located radially outwardly of the plurality of circular ridges, at least one of the central base surface portion, the first intervening base surface portion, the second intervening base surface portion, or the peripheral base surface portion being planar when viewed in cross-section, and wherein the central base surface portion located inside the first circular ridge is spaced below a ridge height of the first circular ridge.

9. The welding electrode set forth in claim 8, wherein the central base surface portion is planar when viewed in cross-section.

10. The welding electrode set forth in claim 8, wherein the central base surface portion is convexly shaped and at least one of the first intervening base surface portion, the second intervening base surface portion, or the peripheral base surface portion is planar when viewed in cross-section.

11. The welding electrode set forth in claim 8, wherein the weld face further includes from one to seven additional circular ridges that project outwardly from the base surface of the weld face.

12. The welding electrode set forth in claim 8, wherein the circumference of the weld face is upwardly displaced from the circumference of the cylindrical body by a transition region.

* * * * *